J. S. KEITHLINE.
FILTER.
APPLICATION FILED JAN. 2, 1915.

1,133,289.

Patented Mar. 30, 1915.

Witnesses
G. J. Baker
B. M. Kent

Inventor
J. S. Keithline
by Foster Freeman Watson & Coit
Attorneys

UNITED STATES PATENT OFFICE.

JOSEPH S. KEITHLINE, OF ASKAM, PENNSYLVANIA.

FILTER.

1,133,289.   Specification of Letters Patent.   Patented Mar. 30, 1915.

Application filed January 2, 1915. Serial No. 150.

*To all whom it may concern:*

Be it known that I, JOSEPH S. KEITHLINE, a citizen of the United States, residing at Askam, Luzerne county, State of Pennsylvania, have invented certain new and useful Improvements in Filters, of which the following is a specification.

This invention relates to filtering devices designed especially for filtering water supplied to a building from a service main.

It is the object of the invention to provide a simple device for filtering water which is inexpensive to manufacture and readily accessible to permit removal and change of the filtering material.

Figure 1:
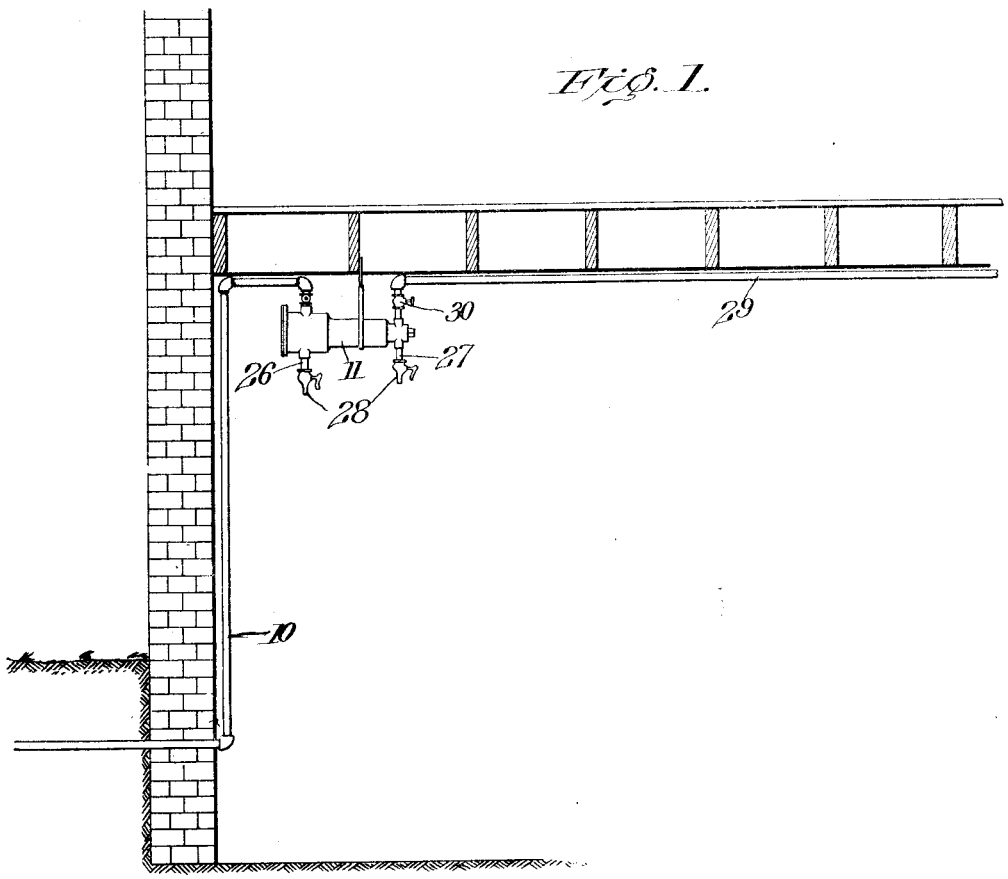
Figure 2:
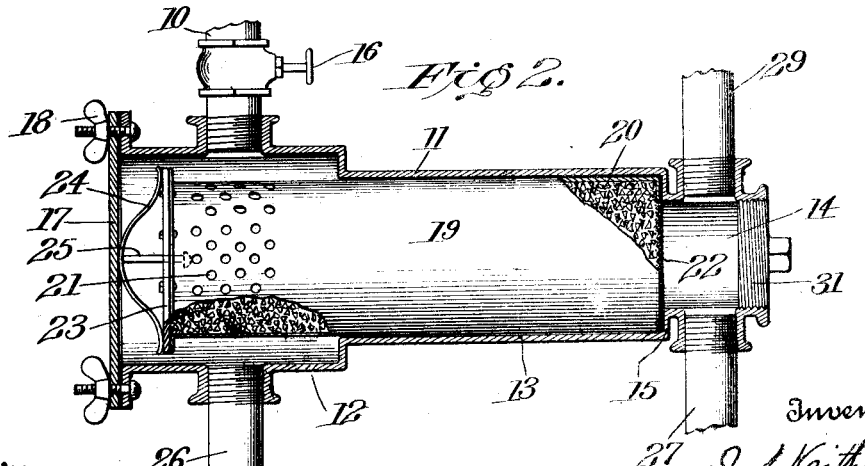

The novel features of the invention will be apparent from the following description taken in connection with the accompanying drawings, in which, Figure 1 shows, diagrammatically, a portion of a building with my filter arranged therein, and Fig. 2 is a sectional view of the filter.

Referring to the drawings, 10 indicates the service pipe leading from a street main to the building. I arrange in this pipe preferably near the point where it enters the building, a filter which comprises a casing 11, preferably provided with three serially arranged chambers, 12, 13 and 14. As shown in Fig. 2, the chamber 13 is smaller than the chamber 12 and the chamber 14 is smaller than the chamber 13 and in this way an abutment 15 is provided at one end of the chamber 13. The pipe 10 connects with the chamber 12 and a valve 16 is provided for the purpose of cutting out the filter when desired. The casing 11 has a removable cover 17, which is secured in position by means of bolts 18, or other suitable fastening devices.

Arranged within the casing 11 and preferably closely fitting the walls of the chamber 13 is a receptacle 19 for the filtering material 20, which may be coke, charcoal or any other suitable material. The receptacle 19 projects into the chamber 12 and is provided therein with perforations 21 which permit water to flow from this chamber to the interior of the receptacle. The opposite end of the receptacle 19 is provided with a screen 22 permitting the passage of water into the chamber 14. It will be observed that the receptacle engages the abutment 15 and is provided with a removable cover 23 which carries a spring 24, this spring engaging the cover 17 and serving to hold the receptacle against the abutment 15. The spring 24 is secured on a pin 25 which is slidably held in the cover 23.

The chambers 12 and 14 are provided with drain pipes 26 and 27, respectively, these pipes being controlled by means of suitable valves 28. The chamber 14 has connected therewith a discharge pipe 29 which is provided with a control valve 30. The pipe 29 leads to the various faucets throughout the building. A removable plug 31 is preferably secured in the end of the casing 11 and permits the finger to be inserted into the casing for the purpose of pushing the receptacle 19 through the opposite end of the casing when the cover 17 has been removed for that purpose.

From the drawing it will be observed that on account of the receptacle 19 closely fitting the wall of the chamber 13 there will be a minimum leakage, along the exterior of the receptacle, from the chamber 12 to the chamber 14, and thus practically all of the water will be forced through the filtering material. The provision of the large chamber 12 provides an annular space about the receptacle 19 so that water will be permitted to enter all of the perforations 21 and space will be provided for the retention of any large particles of foreign material which enter the chamber 12 through the pipe 10.

In the operation of the filter the water passing from the pipe 10 through the chamber 12 and the filtering material to the chamber 14 and thence out through the pipe 29 will have foreign matters removed therefrom and the accumulations in the chamber 12 may be removed from time to time by opening the valve 28 on the pipe 26. It is intended that an extra receptacle 19, always ready for service, be maintained in connection with the filter, so that when the filtering material in one receptacle becomes unfit for further service this receptacle may be quickly removed and the spare receptacle inserted in place thereof.

Having thus described the invention, what is claimed and desired to be secured by Letters Patent is:

In a filter, the combination of a casing provided with three serially arranged chambers, one of the end chambers being of larger diameter than the intermediate chamber and the intermediate chamber having an abutment at the end thereof remote from said larger end chamber, a removable receptacle, containing a filtering medium and arranged in said intermediate chamber in engagement with said abutment, said receptacle extending into said larger end chamber and having perforations in its end portions to permit the passage of water, an inlet pipe connected with said larger end chamber, an outlet pipe connected with the other end chamber, removable closures for said end chambers, means for draining said larger end chamber, and a spring between the closure for the larger end chamber and said receptacle to hold the latter in place.

In testimony whereof I affix my signature in presence of two witnesses.

JOSEPH S. KEITHLINE.

Witnesses:
 JAMES O. DAVIS,
 CHARLES STEIN.